(12) United States Patent
Holzbauer et al.

(10) Patent No.: US 10,149,566 B2
(45) Date of Patent: Dec. 11, 2018

(54) APPLIANCE FOR PREPARING FOOD (71) Applicant: KONINKLIJKE PHILIPS N.V., Eindhoven (NL)

(72) Inventors: Juergen Holzbauer, Eindhoven (NL); Johann Nikolaus Unteregger, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 669 days.

(21) Appl. No.: 14/421,081

(22) PCT Filed: Aug. 21, 2013

(86) PCT No.: PCT/IB2013/056785
§ 371 (c)(1),
(2) Date: Feb. 11, 2015

(87) PCT Pub. No.: WO2014/033592
PCT Pub. Date: Mar. 6, 2014

(65) Prior Publication Data
US 2015/0201787 A1 Jul. 23, 2015

(30) Foreign Application Priority Data

Aug. 29, 2012 (EP) ..................................... 12182259

(51) Int. Cl.
*A47J 27/00* (2006.01)
*A47J 43/046* (2006.01)

(52) U.S. Cl.
CPC ........... *A47J 27/002* (2013.01); *A47J 27/004* (2013.01); *A47J 43/046* (2013.01)

(58) Field of Classification Search
CPC .............................. A47J 27/004; A47J 43/046
USPC ......... 99/340, 348, 400, 403, 426, 438, 476; 219/201, 400, 429, 452.11, 443.1, 448.11
See application file for complete search history.

(56) References Cited

U.S. PATENT DOCUMENTS

| | | | |
|---|---|---|---|
| 2,905,452 A | 9/1959 | Appleton | |
| 4,253,012 A * | 2/1981 | Hughes | H05B 3/748 219/458.1 |
| 5,228,381 A * | 7/1993 | Virgilio | A47J 27/62 219/429 |
| 2005/0223906 A1* | 10/2005 | Xu | A47J 27/004 99/348 |

(Continued)

FOREIGN PATENT DOCUMENTS

| DE | 102007056711 A1 | 5/2009 |
|---|---|---|
| GB | 622115 A | 4/1949 |

*Primary Examiner* — Phuong Nguyen (57) ABSTRACT

An appliance for preparing food comprises a pot (2) for containing food items and a base for supporting the pot (2). The base is equipped with heating means (50) for supplying heat to the pot (2), which comprise at least one heating element (52). The heating means (50) are adapted to only partially contact a bottom (21) of the pot (2) when the pot (2) is in place on the base, through at least one contact area which is at a position which corresponds to a position of the heating element (52). The appliance further comprises stirring means which are adapted to be movably arranged in the pot (2) for stirring food items, which are designed for directing the food items to a directly heated area (60) of the bottom (21) of the pot (2) which corresponds to the contact area of the heating means (50) during their movement.

11 Claims, 6 Drawing Sheets

(56) References Cited

U.S. PATENT DOCUMENTS

| | | | |
|---|---|---|---|
| 2006/0219100 A1 | 10/2006 | Gelfand | |
| 2008/0190301 A1* | 8/2008 | Peng .................... | A47J 27/004 |
| | | | 99/348 |
| 2008/0264927 A1 | 10/2008 | Peng | |
| 2009/0304876 A1* | 12/2009 | Weiss .................... | A23L 1/1815 |
| | | | 426/233 |
| 2011/0185917 A1* | 8/2011 | Goderiaux ............ | A47J 36/165 |
| | | | 99/348 |

\* cited by examiner

APPLIANCE FOR PREPARING FOOD

This application is the U.S. National Phase application under 35 U.S.C. § 371 of International Application No. PCT/IB2013/056785, filed on Aug. 21, 2013, which claims the benefit of International Application No. 12182259.7 filed on Aug. 29, 2012. These applications are hereby incorporated by reference herein.

FIELD OF THE INVENTION

The invention relates to an appliance for preparing food, comprising a pot for containing food items and a base for supporting the pot, wherein the pot is adapted to be removably arranged on the base, and wherein the appliance further comprises stirring means which are adapted to be movably arranged in the pot for stirring food items.

BACKGROUND OF THE INVENTION

In the field of preparing food, many appliances are available which are intended to facilitate processes involved with cooking. For example, when a person wants to roast pieces of meat and has to perform this process in a conventional manner, he/she is compelled to take a pan, to fill the pan with the pieces of meat and probably also some oil or the like, and to put the pan on a stove and activate the stove for heating the content of the pan. Furthermore, the person needs to stir the pieces of meat, at least from time to time, by means of a suitable stirring tool, in order to avoid uneven cooking and possible scorching of the pieces of meat. Hence, the person needs to play a very active role in the cooking process and has no other choice but to stay in the kitchen until the food is ready. However, it is also possible to use a special appliance for performing the cooking process, which is especially adapted to function without any human intervention after having been filled with the ingredients as desired and being switched on. In that case, a person does not need to stay in the kitchen for a long time and has an opportunity to spend more time with family and/or friends, for example.

US 2008/190301 discloses an example of a special appliance as mentioned. In particular, US 2008/190301 relates to a stir cooker which comprises a container having an open top and a sidewall for holding food, a lid for closing the open top of container, a stirrer installed inside the container for stirring food, co-rotation prevention members installed inside the container on the sidewall for preventing food pieces from co-rotating with the stirrer, as the stirrer rotates, a heating tube fixedly installed on a bottom of the container for heating food, a base support disposed underneath the container for supporting the container, a support member installed on the bottom of the container for adapting the container to stand in position on the base support, and a motor installed inside the base support and removably coupled with the stirrer for driving the stirrer to stir food.

According to the teaching of US 2008/190301, the heating tube is fixedly installed on the bottom of the container to save some cost associated with a heater having a thermal diffusion plate, which requires significant amount of material and space. Also, it is stated that by directly installing the heating tube on the bottom of the container, heating efficiency is significantly enhanced. The profile of the stirrer is optimized for minimizing stirring resistance, such that less motor power is required to drive the stirrer, which saves some cost on motors.

The co-rotation prevention members of the stir cooker include a rib-shaped elongated member that extends generally vertical along the sidewall of the container. The upper ends of the members extend substantially to the upper portion of the container. The members are preferably disposed substantially dose to handles of the container such that the members would not obstruct food unloading. The members extend inward to a predetermined distance, away from the sidewall of the container. The predetermined distance is determined based on the size of the container. Proper clearance between the members and the stirrer should be maintained. When food co-rotates with the stirrer and runs against the members, as the stirrer rotates, food pieces at a higher level close to the members would be stopped and tumbled down due to gravity, resulting in better mixing or stirring of food, thereby facilitating heat transfer to and uniform heating of food.

As mentioned in the foregoing, a motor is installed inside the base support for providing rotation power to the stirrer. The motor is removably coupled with a drive shaft, as the container is installed in position. The drive shaft is threaded through a central aperture on the bottom of the container. The upper end of the shaft is engaged with the stirrer, and the lower end of the shaft is coupled with the motor through a coupling device. A seal device is provided for sealing off the interface between the shaft and the bottom of the container.

Even though the stir cooker known from US 2008/190301 has the advantage of being an automatic cooking appliance, there are a number of apparent disadvantages associated with this appliance. For example, the fact that the heating tube is installed directly on the bottom of the container makes it difficult for a user of the stir cooker to clean the container after use. In US 2008/190301, it is stated that the container is convenient for cleaning after use and dishwasher safe, but the fact is that not all surfaces of the container have a smooth appearance. The bottom side of the container where the heating tube is present is one example of an uneven surface, whereas the inner side of the sidewall of the container is another example, due to the presence of the co-rotation prevention members. Another disadvantage resides in the fact that the arrangement of the shaft for driving the stirrer is such that a seal device needs to be used in the container.

SUMMARY OF THE INVENTION

It is an object of the present invention to provide an appliance for preparing food which is capable of performing the functions of heating and stirring food items in such a way that perfect cooking results are obtained, wherein it is possible to have a relatively simple design of the pot for containing food items at the same time. Particularly, it is an object of the present invention to provide an appliance for preparing food in which it is not necessary to have a heating tube installed at a bottom of the pot for guaranteeing proper heating of food items. It is another object of the present invention to find a way of having a relatively large pot so that it is possible to cook food for an entire family in one go, while avoiding a need for compensating for an increase of size by simply realizing a proportional increase of the heating capacity, which would lead to an undesirable increase of energy consumption of the appliance.

In order to achieve the objects as mentioned in the foregoing, the present invention provides an appliance for preparing food which comprises a pot for containing food items and a base for supporting the pot, wherein the pot is adapted to be removably arranged on the base, wherein the base is equipped with heating means for supplying heat to the pot, which heating means comprise at least one heating element, wherein the heating means are adapted to only partially contact a bottom of the pot when the pot is in place on the base, through at least one contact area which is at a position which corresponds to a position of the heating element, and wherein the appliance further comprises stirring means which are adapted to be movably arranged in the pot for stirring food items, which stirring means are designed for directing the food items to a directly heated area of the bottom of the pot which corresponds to the contact area of the heating means during their movement.

For sake of completeness, it is noted that the term "pot" as used in this text is just one of the possible term for indicating a component which is capable of containing food to be prepared. Examples of other words which are applicable in this respect are container, pan and bowl.

Like the stir cooker known from US 2008/190301, the appliance according to the invention comprises a pot for containing food items and a base for supporting the pot. However, in the appliance according to the present invention, the heating means for supplying heat to the pot are associated with the base instead of the pot. In particular, the heating means comprise at least one heating element, wherein the heating means are adapted to only partially contact a bottom of the pot when the pot is in place on the base, through at least one contact area which is at a position which corresponds to a position of the heating element. Hence, the contact area of the heating means is a portion of the heating means which is directly associated with the heating element. On the basis of the fact that contact between the bottom of the pot and the heating means is at the position of the heating element, through at least one contact area, efficient heat transfer from the heating element to the bottom of the pot is guaranteed, wherein heat loss with respect to a conventional situation in which heating means comprise at least one heating element which is directly connected to the bottom of the pot is minimal. Furthermore, the heating process of the bottom of the pot is of a local nature and can therefore be very well controlled. What's more, a sensor can be installed in the base for detecting a temperature at a position directly adjacent to the contact area of the heating means.

The appliance according to the present invention further comprises stirring means which are adapted to be movably arranged in the pot for stirring food items, which stirring means are designed for directing the food items to a directly heated area of the bottom of the pot which corresponds to the contact area of the heating means during their movement. At first sight, it may seem that the capability of the appliance to heat food items in the pot is very much restricted on the basis of the fact that there is only local contact between the heating means and the bottom of the pot. However, as explained in the foregoing, the local contact is at a position which corresponds to a position of the heating element, so that optimal heat transfer is achieved. Moreover, the stirring means are designed in such a way as to realize a flow of food items which is directed towards the directly heated area of the bottom of the pot. As a result, when the stirring means are moved, the food items are directed towards a relatively hot area, wherein the heating characteristics of this area can be known and accurately controlled due to its direct association with the heating element. By causing a movement in the food items which is constantly aimed towards the directly heated area of the bottom of the pot under the influence of the movement of the stirring means, optimal use is made of the heat as provided by the heating element, which is beneficial to the cooking process of the food items.

The functioning of the appliance according to the invention will be further explained by looking at a single food item which is present on the bottom of the pot, in a situation in which the heating means are activated, wherein it is assumed that the food item is resting on an area of the bottom which is outside of the directly heated area, but which is still hot enough for roasting a side of the food item which is in contact with the area. The roasting process at the area as mentioned continues until the food item is encountered by the stirring means. As soon as that happens, the food item is pushed away from the area. In the process, the food item moves along the stirring means as the movement of the stirring means is continued, under the influence of the design of the stirring means and the positioning of the stirring means with respect to the bottom and a standing wall of the pot. As the design of the stirring means is chosen such as to direct food items towards the directly heated area of the bottom of the pot, the food item is made to assume a position against the stirring means which corresponds to the position of that area. According to the present invention, it is advantageous for the design of the stirring means to be such that when a food item reaches the position as mentioned, the food item is allowed to pass the stirring means, in other words, the stirring means is capable of moving under the food item, so that contact between the food item and the stirring means is lost and the movement of the stirring means is continued without the food item. Hence, the food item is left to roast at another place, which is in the directly heated area of the bottom of the pot, or at least close to that area. Of course, the presence of other food items may influence the process as described and may cause the food item to end up at some other position in the pot than an optimal position in the directly heated area. In any case, the food item is allowed to roast again during some time, until it is encountered by the stirring means again. The process is repeated over and over again during operation of the appliance, until the food items have reached a final state as desired.

In the appliance according to the present invention, the heating means are part of the base, so that it is possible to have a pot which is free from such means. Thus, the pot can have a relatively simple design, wherein a bottom side of the pot can have a smooth appearance in that it can be flat or slightly curved if so desired. Furthermore, as the design of the stirring means has a function in directing food items towards a directly heated area of the bottom of the pot, there is no need for ribs or other types of projection at the inside of the pot for preventing co-rotation of food items with the stirring means. The reason is that the stirring means can be designed such as to allow the food items to pass in the directly heated area, as explained in the foregoing. It will be understood that the absence of heating means and co-rotation prevention means greatly contributes to the cleanability of the pot. Also, the absence of co-rotation prevention means makes it easier for a user to add food to the pot and to take food out of the bowl. However, for sake of completeness, it is noted that the fact that there is no need for co-rotation prevention means or other irregularities in the pot does not imply that such means cannot be used in the pot if so desired, while still applying the present invention as well.

In a practical embodiment of the appliance according to the present invention, the stirring means comprise an assembly of a blade and a shaft member, which is adapted to perform a rotary movement about a longitudinal axis of the shaft member during operation, wherein the blade is positioned at an end of the shaft member and extends in a generally radial direction with respect to the longitudinal axis of the shaft member, wherein the longitudinal axis of the shaft member coincides with a longitudinal axis of the pot when the stirring means are in place in the pot, wherein the blade is designed for having a varying passage resistance to food items along its width, wherein the passing resistance is lowest at a radial position which corresponds to a radial position of the directly heated area of the bottom of the pot with respect to the longitudinal axis of the pot.

As is the case in conventional appliances, including the appliance known from US 2008/190301, the stirring means may comprise an assembly of a blade and a shaft member, which is adapted to perform a rotary movement about a longitudinal axis of the shaft member during operation. In such a case, the blade can be adapted to perform the function of directing food items which are encountered by the blade during rotation towards the directly heated area of the bottom of the pot. In particular, the blade can be designed for having a varying passage resistance to food items along its width in order to control where the food items pass the blade and end up on the bottom of the pot, namely at a position in the directly heated area or at least close to that area. For example, a top edge of the blade, i.e. an edge which is at a top side when the stirring means are in place in the pot and the pot has a normal orientation in which the bottom of the pot is at a bottom side, can have a shape which is a most important factor in realizing the function as mentioned. The shape can be such that the height of the blade varies along its width, wherein the blade can be provided with a portion which is significantly lower than the rest of the blade. It will be understood that the blade can be most easily passed by food items at that lowest portion, By choosing an appropriate position of the lowest portion, it can be realized that food items are made to move towards the directly heated area under the influence of contact to the blade by having the lowest portion of the blade at the position of that area, as it is easier for the food items to pass the blade at the lowest portion than at any other portion. Hence, according to the present invention, it is very well possible to have a well-defined hot area in the pot, namely by letting the bottom of the pot contact the heating means at that area as explained earlier, and to guarantee that the hot area is used in a most efficient manner for heating food items, namely by providing the blade with a lowest portion and choosing the position of the lowest portion such as to correspond with the position of the hot area. Hence, the object of the present invention can be achieved without a need for having complex components. On the contrary, the present invention involves a clever design of components known per se, particularly of the heating means, the pot and the stirring means for realizing well-controlled and efficient cooking processes.

For sake of completeness, it is noted that the height of the blade is a dimension of the blade in a direction of the longitudinal axis of the shaft member, and that the width of the blade is a dimension of the blade in a direction which is more or less a radial direction with respect to the longitudinal axis of the shaft member. Furthermore, for sake of completeness, it is noted that in a practical embodiment of the appliance according to the present invention, the stirring means may comprise an assembly of a shaft member and a single blade, but that does not alter the fact that the stirring means may comprise more than one blade. For example, if two or more blades are used in the pot, the blades do not necessarily need to be identical. In case at least two directly heated areas are present at the bottom of the pot, at two different radial positions with respect to the longitudinal axis of the shaft member, it is possible to use two blades, wherein one of the blades is designed for directing food items to one of the directly heated areas, and wherein another of the blades is designed for directing food items to another of the directly heated areas.

Advantageously, the blade is orientated such as to be backwardly inclined, as seen in a direction of rotation and with respect to a perpendicular orientation to the bottom of the pot. In such a case, the extent to which the blade is inclined is another factor influencing the passage resistance of the blade. Particularly, the passage resistance decreases when an angle between the blade and the bottom of the pot decreases, as in that case, the extent to which the blade constitutes a barrier for food items to pass decreases. The angle as mentioned may be in a range of 15° to 18° at the portion of the blade which is at a radial position which corresponds to a radial position of the directly heated area of the bottom of the pot with respect to the longitudinal axis of the pot, whereas the angle may be in a range of 30° to 50° in at other portions of the blade.

Like many conventional pots, it is very practical for the bottom of the pot to have a circular periphery, wherein an inner surface of a standing wall has a circular periphery as well. For sake of completeness, it is noted that a term like "circular" as used in this text should not be understood such as to relate a theoretical concept of the term, but rather to a practical concept of the term, wherein minor deviations of the theoretical concept are possible due to manufacturing tolerances. When the stirring means are arranged such as to be rotatable in the pot, and comprise a single blade as mentioned in the foregoing, a symmetric and even cooking process can be achieved when peripheries of the pot are circular.

In any case, at least a portion of the heating element may be shaped like a circular ring, wherein the contact area of the heating means extends along at least a major part of the ring-shaped portion of the heating element. Hence, the directly heated area of the bottom of the pot may be shaped like a circular ring, or at least a segment of a circular ring. Furthermore, assuming that the stirring means comprise a blade, both the ring-shaped portion of the heating element and the contact area of the heating means are preferably located in a range of 0.6 to 0.85 of a radius of the bottom of the pot, wherein the portion of the blade having the lowest passing resistance is present at a corresponding radial position. Hence, during operation, the food items are directed to an area of the bottom of the pot which is at a corresponding radial position. It has been found that excellent cooking results can be obtained when the range as mentioned is taken into account. If the radial position would be more to the inside of the pot than the lowest value of the range, the surface of the area would be smaller and the length of the area would be shorter, which would cause food items to move away from the area due to lack of space for the food items. If the radial position would be more to the outside of the pot than the highest value of the range, the movements of the food items would also be influenced by the standing wall of the pot, which functions as a stop in the radial direction, so that the extent to which the movements can be controlled would be decreased.

Another aspect of the design of the blade of the stirring means which is related to the function of directing the flow of food items to the directly heated area of the bottom of the pot is that the blade may have a curved shape which has a backward orientation with respect to the direction of rotation, i.e. which is convex in the direction of rotation. As a result of such a shape of the blade, food items which are more at the inside of the pot can be expected to be inclined to move more to the outside of the pot in a situation in which they have been encountered by the blade and move along with the blade.

Especially when the pot has considerable radial dimensions, for example, a radius of the bottom which is larger than 100 mm, it is advantageous if the heating element comprises two portions which are shaped like a circular ring, wherein the ring-shaped portions are positioned according to a concentric arrangement, and wherein the at least one contact area of the heating means for contact to the bottom of the pot is only at a position which corresponds to a position of a ring-shaped portion which is at an outside of the concentric arrangement. In such an arrangement, controlled heating of food items takes place at the position of a ring-shaped area of the bottom of the pot which has a circular shape, wherein a radial position of the area can be in the range as mentioned earlier. In an area which is more to the inside of the pot, additional heat is provided by a portion of the heating element which is at a position where there is no contact to the bottom of the pot. Hence, the additional heat is not provided through conduction, different from the heat transfer process which takes place at the position of the other portion of the heating element which is present more to the outside of the pot. In that way, it is possible to both realize a well-controlled and optimal cooking process and avoid a situation in which most of the bottom of the pot would be too cold for playing a role in the cooking process, as a result of which the cooking process would take too long and it would not be possible to have all food items at an acceptable temperature.

Thus, by having an additional portion of the heating element which is very well capable of heating the bottom of the pot on the basis of radiation, it is possible to maintain the advantages of using a precisely defined heating area at the bottom of the pot as explained in the foregoing in a relatively large pot as well without introducing problems in the field of heating capacity. On the basis of this fact, the advantages of applying the present invention can be combined with the advantages of using a relatively large pot, which include the possibility of cooking food for a whole family and the possibility to use standard kitchen tools such as a standard ladle for taking out the food from the pot when it is ready.

The heating means may comprise a heating plate accommodating/covering the at least one heating element. In the case, contact between the heating means and the bottom of the pot is along at least one area of the heating plate, particularly a contact area which is located at the heating element.

In a cooking process, it is preferred if different sides of food items are made to contact the bottom of the pot during approximately equal periods of time in order to achieve even browning of the food items. In order to ensure that the food items are turned on a regular basis during the cooking process, it is proposed to equip the blade of the stirring means with a fin-like projection for making food items turn during movement of the stirring means, which projection extends from the blade, in a generally tangential direction with respect to the shaft member of the stirring means. In particular, the fin-like projection can be present at a side of the blade which is a back side of the blade as the blade performs a rotary movement. As the fin-like projection acts like a flow restrictor, food items are forced out of direction under the influence of the fin-like projection at the moment they pass the blade, as a result of which they perform a tilting movement so that another side of the food items comes to face the bottom of the pot.

When taking practical dimensions of the pot into account, it has been found that it is advantageous when the blade of the stirring means has exactly one fin-like projection, and when that single projection is located in a range of 0.3 to 0.6 of a total radial dimension of the blade. In this way, it is achieved that big food items are allowed to pass through without obstruction, while the function of the fin to turn food items is preserved at the same time, by creating an effect when more than two food items come together in one go.

In a practical embodiment of the assembly of a blade and a shaft member, the blade has a tilted orientation about an axis extending in a longitudinal direction of the blade. In this way, it is achieved that when the blade is made to perform a rotary movement in the pot, it is possible to let the food items which are encountered by the blade gradually move up the blade instead of just pushing against the food items which would more likely be the case if the blade would be orientated more or less perpendicular to the bottom of the pot instead of being backwardly inclined as seen in the direction of rotation.

Assuming that the stirring means are adapted to perform a rotary movement during operation, it is advantageous if the base is equipped with means for driving the stirring means at a speed which is well below 20 revolutions per minute, for example, 5 revolutions per minute. Advantages of a speed which is relatively low when compared to conventional situations involve allowing enough time for food items to be roasted on the bottom of the pot, as the food items are not too frequently encountered by the stirring means, and making it possible for a user to perform actions as desired on the food in the pot without needing to stop the actions at an annoying frequency which would otherwise be the case.

In a case in which the stirring means comprise at least one blade, a distance between the bottom of the pot and an edge of the blade of the stirring means which is closest to the bottom of the pot when the stirring means are in place in the pot may very well be lower or at most equal to 0.5 mm. In any case, it is advantageous for the distance as mentioned to be well below 2 mm. On the basis of having a sufficiently small distance, small food items like onion pieces can be optimally lifted when they are encountered by the blade. Also, food items like meat pieces which get stuck to the bottom of the pot at the start of a cooking process can easily be pushed away and turned when the distance is sufficiently small. On the other hand, if the distance would be too small, the bottom of the pot would be scraped dry, as it were, and the cooking process would be negatively influenced.

Other dimensional factors of the appliance according to the present invention involve a distance between a standing wall of the pot and a free end of the blade which is closest to the standing wall of the pot when the stirring means are in place in the pot, and a difference between the height of the lowest portion of the blade and the height of the free end of the blade. In respect of the first factor, it is noted that in principle, the blade should extend all the way to the standing wall of the pot in order to be able to move and turn all food items. However, there should be some space between the free end of the blade and the standing wall of the pot in order to avoid food items from getting stuck between the free end of the blade and the standing wall of the pot. In view thereof, the first factor is preferably in a range of 5 to 8 mm. In respect of the second factor, it is noted that the free end of the blade should be high enough to have a slope between the free end of the blade and the lowest portion of the blade, so that the blade is capable of performing the function of turning food items. However, the end portion should not be so high that the flow of food items would be obstructed and the food items would be pushed along in front of the blade. An optimal height of the free end of the blade is in a range of 10 to 15 mm, and a difference between the height of the lowest portion of the blade and the height of the free end of the blade is preferably at most 5 mm.

In a practical embodiment of the appliance according to the present invention, the base comprises a drive spindle for driving the stirring means, which drive spindle projects from the base and is rotatably arranged with respect to the base, wherein the pot comprises a tube member which is open at both ends and which extends in the pot starting from a location at the bottom of the pot where a hole is provided in the bottom, wherein the hole is adapted to allow the drive spindle to pass when the pot is put in place on the base, wherein the tube member is adapted to accommodate a major part of the drive spindle, and wherein the shaft member of the stirring means is adapted to cover both the tube member and an end of the drive spindle projecting beyond an end of the tube member. One of the advantages of having this type of arrangement is that there is no need for applying sealing means in the pot.

Furthermore, a pot for use in an appliance for preparing food is part of the present invention, wherein the appliance further comprises a base for supporting the pot, which base is equipped with heating means for supplying heat to the pot, wherein the pot is free from any kind of heating means, and wherein the pot comprises a tube member which is open at both ends and which extends in the pot starting from a location at the bottom of the pot where a hole is provided in the bottom. Preferably, at least a bottom of the pot has a sandwich structure for optimal heat transfer between the heating means and an inner surface of the bottom of the pot. As explained in the foregoing, the pot can have smooth surfaces for improving cleanability and for facilitating adding food to the pot and taking out food from the pot. Also, there is no need for applying sealing means in the pot, among other things because the tube member is suitable for covering a major part of a spindle for driving stirring means which may be applied in the pot.

A blade for use in a pot is also part of the present invention, particularly a blade for stirring food items in the pot when performing a rotary movement, comprising a relatively high portion at one end and a relatively low portion near another end, wherein a height of a lowest portion of the blade is in a range of 0.2 to 0.3 of a height of a highest portion of the blade, and wherein the lowest portion is located in a range of 0.6 to 0.85 of a total width of the blade, as seen from the end where the relatively high portion is. As explained in the foregoing, a blade which is designed in such a way is suitable to be used for directing food items to a certain area of the bottom of the pot in which the blade is to be applied, which may be an area shaped like a circular ring and positioned more to the outside of the pot than to the inside, as the food items can be expected to mainly pass the blade at the position of the lowest portion.

The present invention is especially applicable in an appliance which is intended to be used for roasting food items, wherein the food items contact the bottom of the pot of the appliance, besides possible other cooking processes.

The above-described and other aspects of the present invention will be apparent from and elucidated with reference to the following detailed description of an appliance for preparing food, comprising a pot for containing food items and a base for supporting the pot, wherein the pot is adapted to be removably arranged on the base, wherein the base is equipped with heating means for supplying heat to the pot, while the pot is free from heating means, and wherein the appliance further comprises stirring means which are adapted to be rotatably arranged in the pot for stirring food items and to direct the food items to a particular area of the bottom of the pot in order to have an optimal roasting and browning process of the food items.

BRIEF DESCRIPTION OF THE DRAWINGS

The present invention will now be explained in greater detail with reference to the figures, in which equal or similar parts are indicated by the same reference signs, and in which.

DETAILED DESCRIPTION OF EMBODIMENTS

Figure 1:
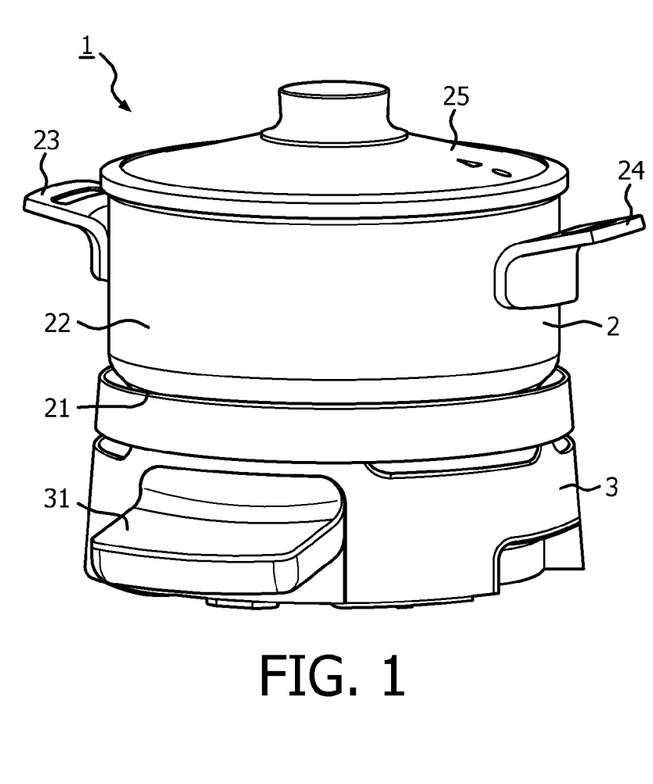
FIG. 1 shows a perspective view of the appliance according to the present invention, wherein the pot of the appliance is in place on the base of the appliance.

FIG. 1 shows an appliance 1 according to the present invention, which is adapted to be used for preparing food, and which comprises a pot 2 for containing food items and a base 3 for supporting the pot. In FIG. 1, the appliance 1 is shown in a configuration in which the pot 2 is in place on the base 3. The state and the orientation of the appliance 1 as shown are the normal and operational state and orientation of the appliance 1. In view thereof, terms like "top" and "bottom" as used in the following are to be understood as being applicable in the state and orientation of the appliance 1 as shown. The appliance 1, which will hereinafter be referred to as cooking appliance 1, is suitable for cooking many types of food, wherein food items may be pieces of meat and/or pieces of vegetables, which are just two examples of a large range of possibilities.

Figure 2:
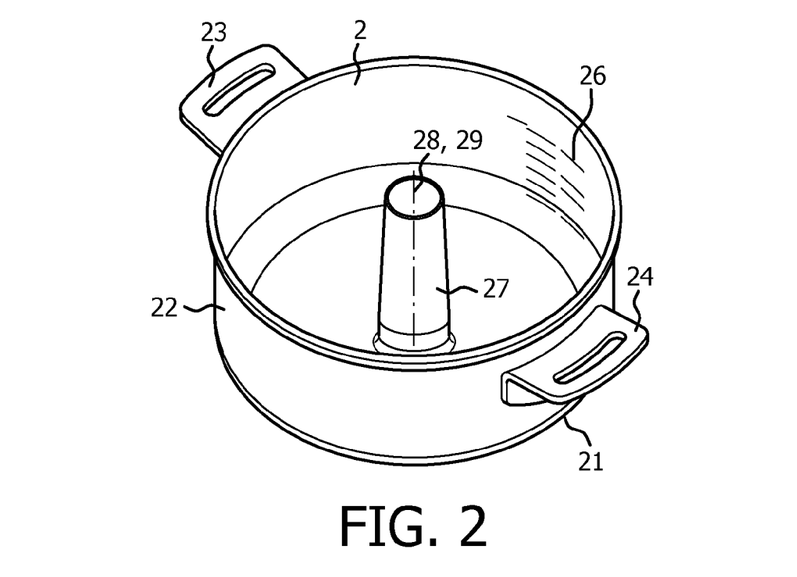
FIG. 2 shows a perspective view of the pot.

The pot 2 is shown in FIG. 2. In general, like conventional pots, the pot 2 comprises a bottom 21 and a standing wall 22 extending from the bottom 21. In the shown example, the bottom 21 has a circular periphery, wherein peripheries of an inner surface and an outer surface of the standing wall 22 are circular as well. Furthermore, like conventional pots, the pot 2 has grips 23, 24 for allowing a user to pick up the pot 2 and transport it to a desired place. Also, as shown in FIG. 1, a cover 25 may be provided for covering an open side of the pot 2. A further option for the pot 2 is to be provided with a scale 26 at the inner surface of the standing wall 22, which may help a user in determining whether an appropriate quantity of liquid is added to the pot 2 in case a liquid is used as an ingredient of food to be cooked, such as soup.

At a central position in the pot 2, a tube member 27 is present, wherein a longitudinal axis 28 of the tube member 27 coincides with a longitudinal axis 29 of the pot 2. Both ends of the tube member 27 are open, and a hole is present in the bottom 21 of the pot 2 at the location of the tube member 27.

The base 3 has a function in accommodating heating means for supplying heat to the pot 2, so that food in the pot 2 can be cooked under the influence of heat. Furthermore, the base 3 serves for accommodating other components than the heating means, such as means for controlling the operation of the cooking appliance 1 on the basis of input provided by a user, and a panel 31 or the like for allowing a user to enter appropriate information, to switch the appliance 1 on and off, to read information about the cooking process in case the panel 31 comprises a display or the like, etc.

The cooking appliance 1 according to the present invention is intended to serve as an automatic cooking appliance 1. This means that all that a user needs to do is fill the pot 2 with food items as desired, put the cover 25 in place no the pot 2, put the pot 2 in place on the base 3, and switch on the appliance 1 in order to perform and control a cooking process of the food items. The user may also enter information which is relevant to the cooking process, wherein settings of the cooking process such as a cooking time and a relation between temperature and time are determined on the basis of that information. The information may be general information such as information about the type of food items and/or the quantity/weight of food items, wherein the cooking appliance 1 may comprise controlling means which are programmed to automatically determine the appropriate settings of the cooking process. That does not alter the fact that the information may also be specific information such as a desired cooking time and/or a desired cooking temperature, in which case the user directly determines the settings.

Figure 3:
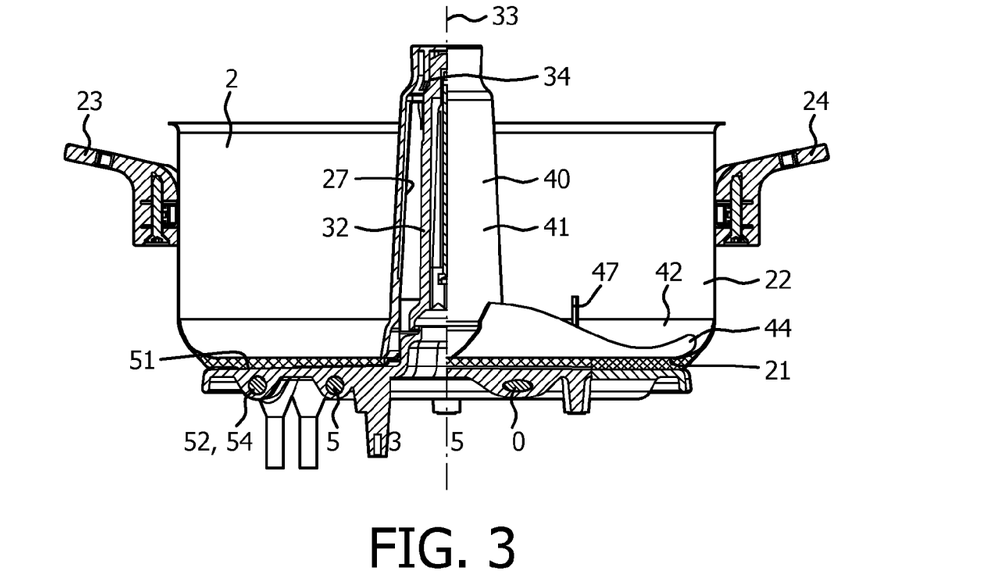
FIG. 3 shows a full sectional view of the pot and a top portion of the base comprising heating means, and a half sectional view of stirring means arranged in the pot.
Figure 4:
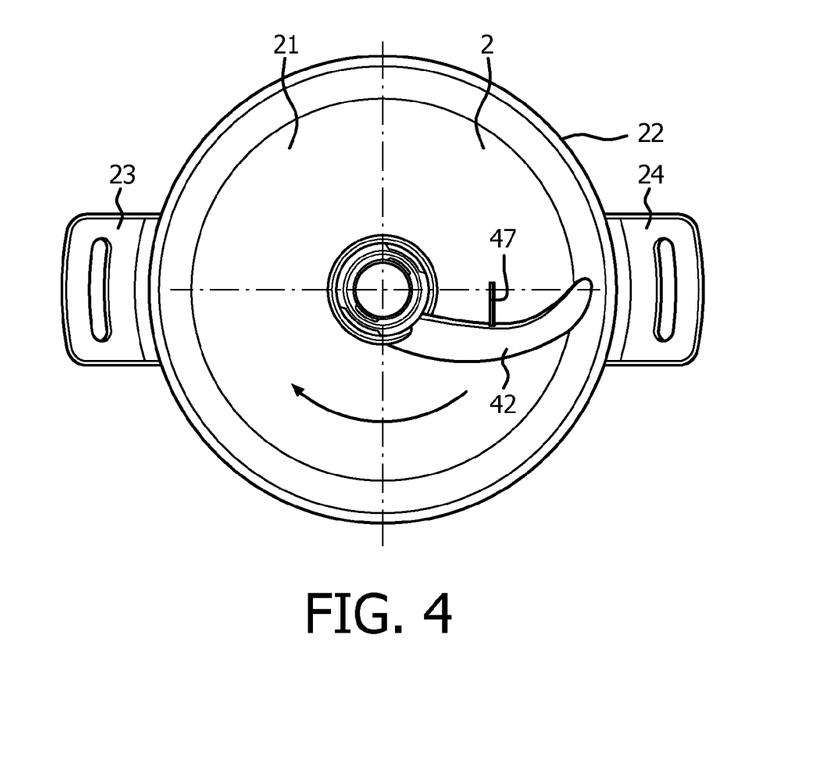
FIG. 4 shows a top view of the pot and the stirring means.
Figure 5:
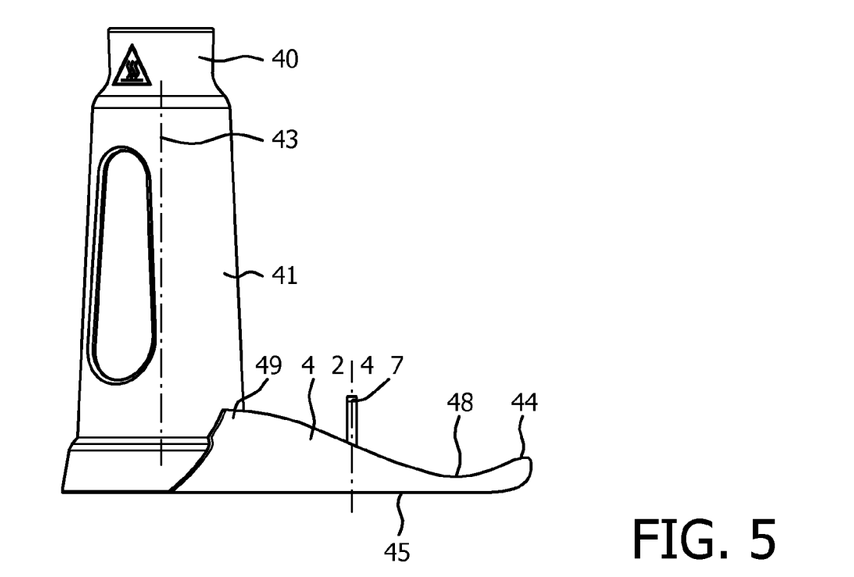
FIG. 5 shows a side view of the stirring means.
Figure 7:
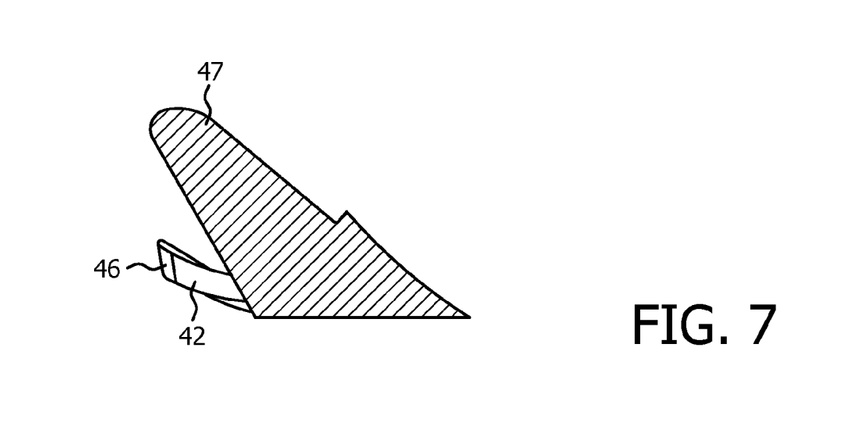
FIG. 7 shows a full sectional view of a blade of the stirring means at a position where a fin-like projection is present on the blade.
Figure 8:
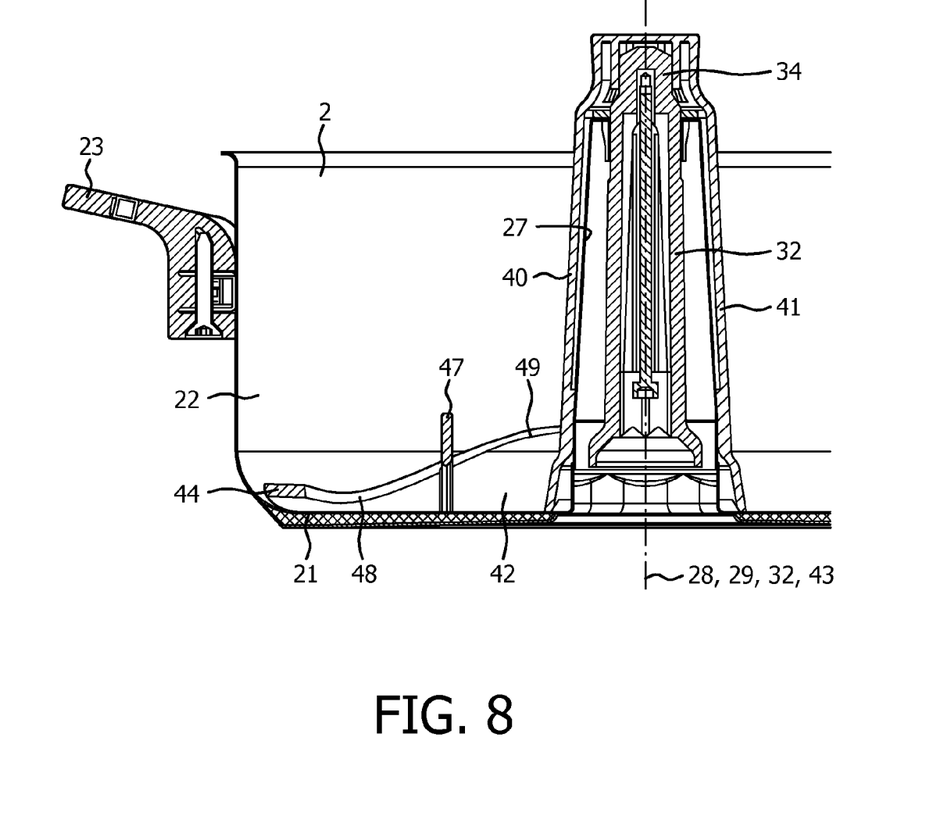
FIG. 8 shows a full sectional view of a portion of the pot, the stirring means and a spindle for driving the stirring means, which projects from the base and extends in the pot, through a hole in a bottom of the pot.

When the cooking appliance 1 is operated, the heating means are activated, and the temperature of the bottom 21 of the pot 2 is increased under the influence of the heat supplied by the heating means. The temperature of the standing wall 22 of the pot 2 is increased as well, albeit to a considerably lesser extent. In order to avoid scorching of food items resting on the bottom 21, means 40 are applied for stirring the food items. An example of such stirring means 40 is shown in FIGS. 3-6, wherein FIGS. 3 and 4 illustrate a proper positioning of the stirring means 40 in the pot 2, and wherein FIG. 3 also shows the heating means 50 of the base 3 as located underneath the bottom 21 of the pot 2. FIG. 7 shows a detail of the stirring means 40 which will be explained later. FIG. 8 serves to illustrate how the stirring means 40 can be coupled to a drive spindle 32 which projects from the base 3, which extends inside the tube member 27 of the pot 2, and which serves for driving the stirring means 40 such as to perform a movement in the pot 2 for realizing a stirring function as desired.

In general, the stirring means 40 comprise a shaft member 41 which is suitable to be arranged over the tube member 27 of the pot 2, and a blade 42 which is attached to a bottom end of the shaft member 41. The blade 42 extends in a substantially radial direction with respect to a longitudinal axis 43 of the shaft member 41, which longitudinal axis 43 coincides with the longitudinal axis 28 of the tube member 27 when the stirring means 40 are correctly positioned in the pot 2, and therefore also with the longitudinal axis 29 of the pot 2. During operation, the stirring means 40 are made to rotate about the longitudinal axis 43 of the shaft member 41, so that it is achieved that the blade 42 moves over a ring-shaped portion of the bottom 21 of the pot 2 for encountering food items which are present on that portion. In the direction of the rotary movement, the pot 2 may be fixed with respect to the base 3 in any suitable manner in order to prevent the pot 2 from moving along with the stirring means 40. The direction of the rotary movement is indicated by means of a curved arrow in FIG. 4.

Preferably, the blade 42 extends almost all the way to the standing wall 22 of the pot 2, in order to be capable of performing a stirring function at almost the entire area of the bottom 21 of the pot 2. For example, a distance between the standing wall 22 of the pot 2 and a free end 44 of the blade 42 can be in a range of 5 to 8 mm. Furthermore, it is preferred if a bottom edge 45 of the blade 42 is close to the bottom 21 of the pot 1, so that a situation in which the blade 42 passes over food items without touching them is avoided as much as possible. For example, a distance between the bottom 21 of the pot 2 and the bottom edge 45 of the blade 42 can be lower than or at most equal to 0.5 mm. The speed of the rotary movement of the stirring means 40 may be well below 20 revolutions per minute in order to have effective roasting and browning processes in the pot 2, wherein food items are allowed to contact the bottom 21 of the pot 2 during a sufficiently long time between encounters with the blade 42.

As mentioned earlier, the base 3 comprises a drive spindle 32 for driving the stirring means 40. The drive spindle 32 projects from the base 3 in an upward direction and is movably arranged with respect to the base 3, such as to be rotatable about its longitudinal axis 33, which coincides with both the longitudinal axis 43 of the shaft member 41 of the stirring means 40 and the longitudinal axis 28 of the tube member 27, and therefore also with the longitudinal axis 29 of the pot 2 when the pot 2, the base 3 and the stirring means 40 are in the correct mutual positions with respect to each other. A length of the drive spindle 32, i.e. a dimension of the drive spindle 32 in the longitudinal direction, is adapted to a length of the tube member 27, i.e. a dimension of the tube member 27 in the longitudinal direction, in such a way as to extend beyond the tube member 27 to some extent, so that it is possible for the stirring means 40 to be coupled to a free end 34 of the drive spindle 32. The shaft member 41 of the stirring means 40 is adapted to cover both the tube member 27 and the free end 34 as mentioned. In this arrangement, it is not necessary to have a sealing of some kind at the stirring means 40, as it is not possible for food items to reach the drive spindle 32 on the basis of the presence of the tube member 27 in the pot 2.

The blade 42 is designed for allowing food items to move along with the blade 42 for a short time and to pass the blade 42 at a certain point, until they are encountered by the blade 42 again. In the process of moving along with the blade 42, it may be so that a radial position of the food items is changed, as will be explained later. In order to ensure smooth rotation of the stirring means 40 and facilitate passing of the food items over the blade 42, the blade 42 has an orientation which can be denoted as a tilted orientation about an axis extending in a longitudinal direction of the blade 42, and a backwardly inclined orientation with respect to the bottom 21 of the pot 2, as seen in the direction of rotation. This can be seen in FIG. 7, as FIG. 7 shows that a back side 46 of the blade 42 is at a largest distance/height with respect to the bottom 21 of the pot 2.

Furthermore, FIGS. 3-8 show that the blade 42 has a fin-like projection 47 which extends in a generally tangential direction with respect to the shaft member 41. In FIG. 7, a sectional view of the blade 42 at the position where the fin-like projection 47 is present on the blade 42 is shown. In the shown example, the blade 42 comprises exactly one fin-like projection 47, wherein the projection 47 is located in a range of 0.3 to 0.6 of a total radial dimension of the blade 42. As seen in the direction of rotation, the projection 47 is located at the back side of the blade 42. During the rotation of the blade 42, the projection 47 has an important function in making food items turn when passing the blade 42, so that it is ensured that the food items touch the bottom 21 of the pot 2 at different sides throughout the cooking process.

Figure 9:
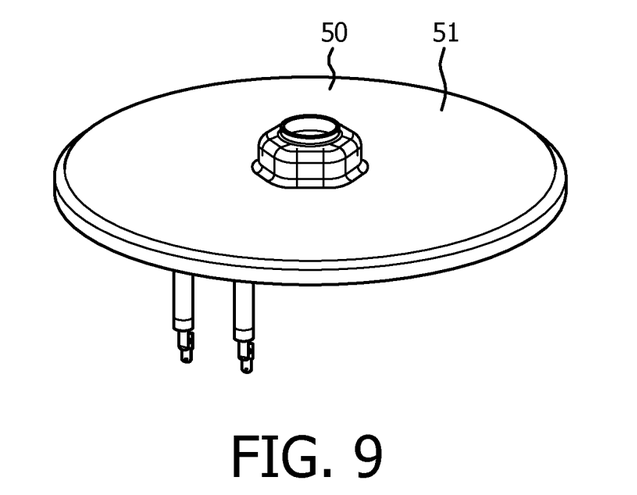
FIGS. 9 and 10 show perspective views of a heating plate and a heating element which are part of the heating means.
Figure 10:
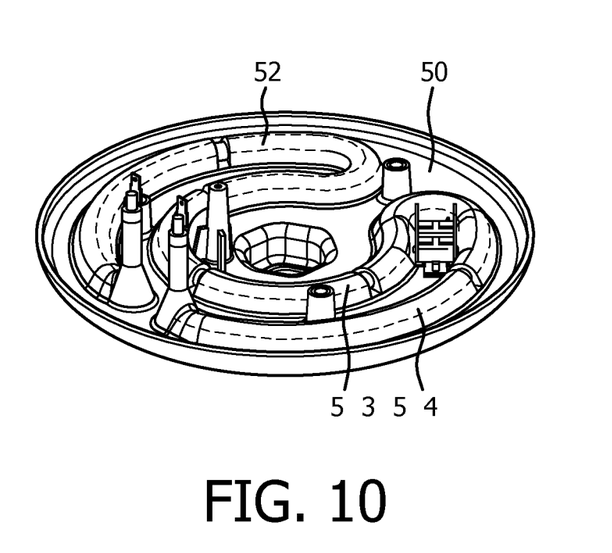
Figure 11:
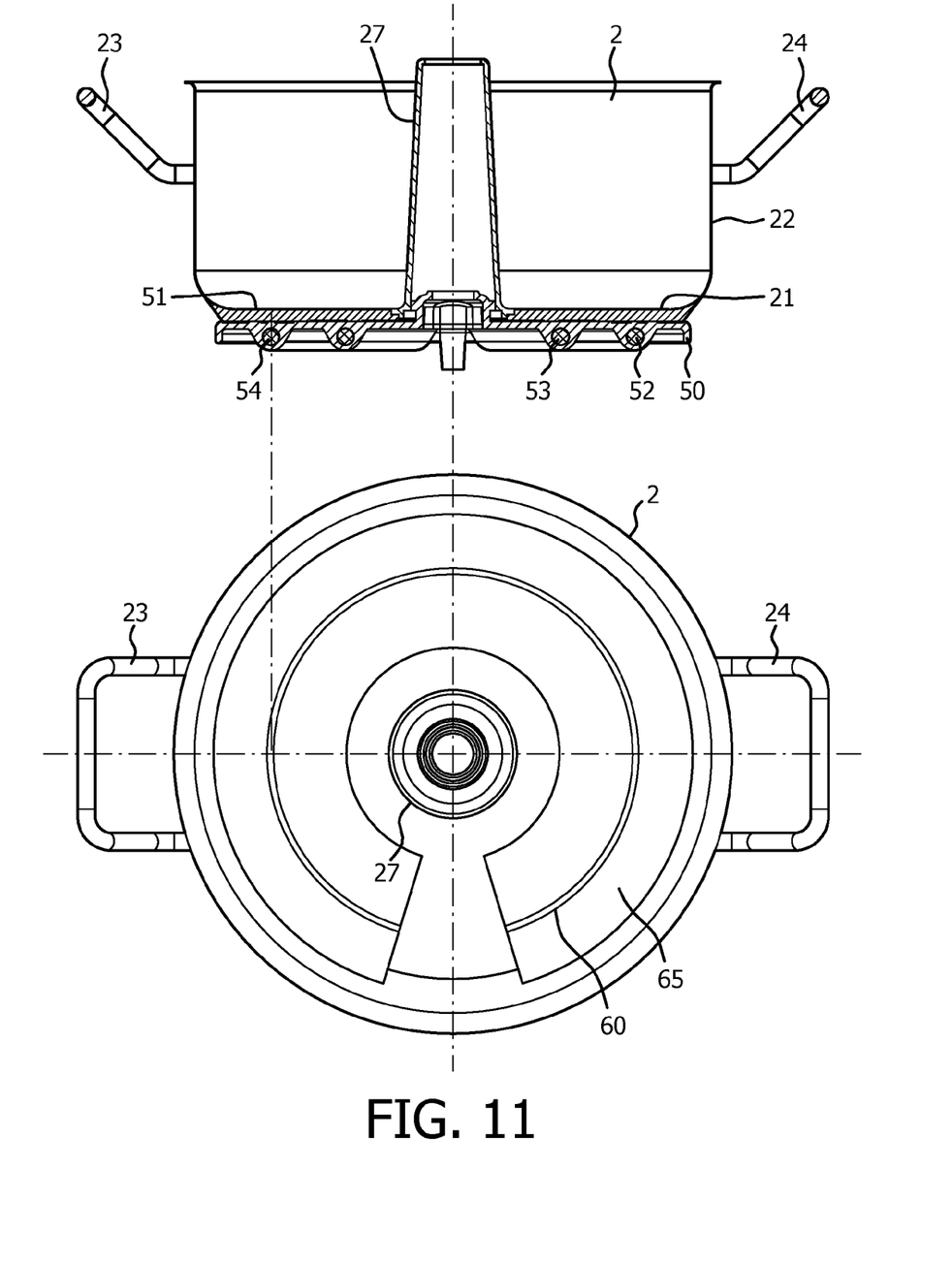
FIG. 11 illustrates a relation between a location of hot areas in the pot and a positioning of the heating element.

FIGS. 9 and 10 show an embodiment of the heating means 50 which are part of the base 3 as mentioned earlier. In particular, the heating means 50 comprise a heating plate 51 having a circular periphery and a heating element 52 arranged at a bottom side of the heating plate 51. When the pot 2 is in place on the base 3, a bottom side of the bottom 21 of the pot 2 contacts a top side of the heating plate 51, but only along a defined area. In the shown example, the heating element 52 comprises an inner circular portion 53 and an outer circular portion 54, which are positioned according to a concentric arrangement. The extent to which the bottom 21 of the pot 2 at the bottom side and/or the heating plate 51 at the top side are flat is adjusted in such a way that the bottom 21 of the plate 2 and the heating plate 51 contact each other only along an area which is associated with the outer circular portion 54 of the heating element 52. Hence, in the pot 2, an area of the bottom 21 which is shaped like a ring segment can be identified as a directly heated area, i.e. an area which is heated on the basis of contact to heating means. Preferably, at least the bottom 21 of the pot 2 has a sandwich structure for optimal heat transfer between the heating plate 51 and an inner surface of the bottom 22 of the pot 2. It is noted that the directly heated area is shown and indicated by reference numeral 60 in FIG. 11, which shows both a top view of the pot 2 at a bottom side and a full sectional view of the pot 2 and the underlying heating means 50 at a top side, wherein a relation between a position of the directly heated area 60 and the outer circular portion 54 of the heating element 52 is indicated by means of a dashed line. A total area 65 where the bottom 21 of the pot 2 gets sufficiently hot for playing a role in cooking process covers the directly heated area 60 and areas at both an inner side and an outer side of the directly heated area 60, as heat is transferred through the bottom 21 from the directly heated area 60 to all sides. Also, the inner circular portion 53 of the heating element 52 heats an area at an inner side of the directly heated area 60, as the heating plate 51 is only at a short distance from the bottom 21 of the pot 2 at the position of the inner circular portion 53 so that most of the heat emitted by the inner circular portion 53 can be used for increasing the temperature of the bottom 21 through radiation. Within the framework of the present invention, it is preferred for the outer circular portion 54 of the heating element 52 and an associated contact area of the heating plate 51 to be located in a range of 0.6 to 0.85 of a radius of the heating plate 51.

The limited extent to which the bottom 21 of the pot 2 is contacted by the heating means 50 can be realized in any appropriate manner. According to a practical option, the bottom side of the bottom 21 of the pot 2 and/or the top side of the heating plate 51 can be slightly curved. In any case, according to the present invention, the nature of the limited contact is such that a space which is present between the bottom 21 of the pot 2 and the heating plate 51 in an area outside of the contact area is maintained under all circumstances, particularly all possible temperatures, ranging from relatively low temperatures during a start-up phase of the operation of the cooking appliance 1 to relatively high temperatures at cooking processes.

It is very well possible to control a temperature prevailing at the directly heated area 60 in an accurate manner, namely by having at least one sensor which is positioned directly adjacent the outer circular portion 54 of the heating element 52. In such a case, the sensor is nearest to the directly heated area 60 as can be while being at a position in the base 3, so that the measurements performed by the sensor can be considered as being representative of the temperature prevailing at the directly heated area 60.

According to the present invention, the blade 42 of the stirring means 40 is shaped in a special way, wherein the design of the blade 42 is chosen such as to ensure that a flow of food items which is obtained during stirring is directed towards the directly heated area 60. Hence, during a cooking process, the food items are continually made to move towards the directly heated area 60, i.e. to the area where the highest temperature is prevailing and where the temperature is controlled best. In that way, it is achieved that the cooking process takes place under optimal heating circumstances and can be controlled best.

In order to achieve the flow directing effect as mentioned, the design of the blade 42 is aimed at having a lowest passing resistance to food items at a radial position which corresponds to a radial position of the directly heated area 60. Two factors of the design which are determining factors in respect of the passing resistance are a height of the blade 42 and an extent to which the blade 42 is tilted with respect to a perpendicular orientation to the bottom 21 of the pot 2. The passing resistance increases as the height increases and/or the extent to which the blade 42 is tilted increases. The design of the blade 42 may be such that the first factor is at a minimum and the second factor is at a maximum at the radial position as mentioned, as is the case in the shown example, wherein a portion 48 of the blade 42 which is at the radial position as mentioned can be denoted as being a lowest portion 48 and a most backwardly inclined portion 48, i.e. a portion 48 which is flattest with respect to the bottom 21 of the pot 2. In any case, it is advantageous if a combination of the factors is such that the passing resistance is at a minimum at the radial position as mentioned. It is noted that it is advantageous if a height of the lowest portion 48 of the blade 42 is in a range of 0.2 to 0.3 of a height of a highest portion 49 of the blade 42, which is present at a side of the blade 42 where the blade 42 is attached to the shaft member 41. Furthermore, it is noted that these dimensions and other dimensions mentioned in the foregoing are applicable to a cooking appliance 1 in which a bottom 21 of the pot 2 has a radius in an order of 110 mm, but also to a cooking appliance 1 having a larger or smaller pot 2.

It appears from the foregoing that the blade 42 is designed for directing food items to the directly heated area 60 of the bottom 21 of the pot 2. During operation, the food items are mainly passing the blade 42 at the position of the directly heated area 60 and adjacent areas. As a result, it is ensured that the food items are present in the total area 65 where the bottom 21 of the pot 2 is sufficiently hot and capable of roasting the food items in a fast and even manner.

Figure 6:
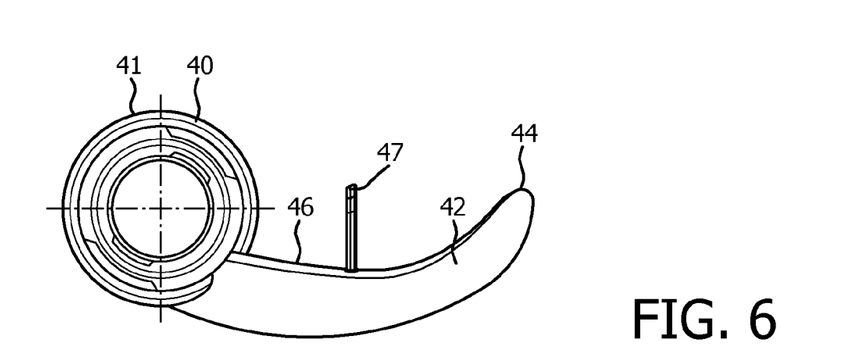
FIG. 6 shows a top view of the stirring means.

In the top views of the blade 42 as shown in FIGS. 4 and 6, it can be seen that the blade 42 has a curved shape which has a backward orientation with respect to the direction of rotation. This aspect of the design of the blade 42 contributes to an inclination of food items which are more at the inside of the pot 2 to move more to the outside of the pot 2 in a situation in which they have been encountered by the blade 42 and move along with the blade 42. The standing wall 22 of the pot 2 serves as a stop for the outwardly directed flow, which is another factor in achieving that food items end up mostly at the directly heated area 60 or near that area 60.

All in all, the present invention provides a cooking appliance 1 which is easy to use and which guarantees excellent cooking results. Heating of the bottom 21 of the pot 2 takes place in a well-controlled manner, wherein heating means 50 are only present in the base 3, and wherein contact between the bottom 21 of the pot 2 and the heating means 50 is only established along a well-defined area which is associated with a position of at least one heating element 52 which is part of the heating means 50. The stirring means 40 which are used in the pot 2 are not just means for causing a stirring effect. On the contrary, the design of the stirring means 40 is carefully chosen such as to let the stirring means 40 have a function in directing a flow of food items to a directly heated area 60 of the bottom 21 of the pot 2.

It will be clear to a person skilled in the art that the scope of the present invention is not limited to the examples discussed in the foregoing, but that several amendments and modifications thereof are possible without deviating from the scope of the present invention as defined in the attached claims. While the present invention has been illustrated and described in detail in the figures and the description, such illustration and description are to be considered illustrative or exemplary only, and not restrictive. The present invention is not limited to the disclosed embodiments.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the present invention.

In the shown example, the heating means 50 comprise a heating plate 51 for contacting the bottom 21 of the pot 2 and furthermore distributing heat emitted by the underlying heating element 52 in an area covered by the bottom 21 of the pot 2. However, that does not imply that the present invention would not be applicable in situations in which the heating plate 51 is absent and at least one portion of the heating element 52 itself contacts the bottom 21 of the pot 2. In general, as mentioned in the foregoing, contact between the heating means 50 and the bottom 21 of the pot 2 takes place in at least one area, wherein the number of areas may be chosen freely. A relatively large contact area may be interrupted at some places, so that actually at least two contact areas are obtained. The at least one heating element 52 of the heating means 50 may have any suitable shape. For example, the heating element 52 may comprise a single circular portion 53, 54. With reference to the shown example, it is possible to omit the inner circular portion 53 which is not involved in the contact between the heating means 50 and the bottom 21 of the pot 2. Furthermore, the heating element 52 may have another shape than a loop or a nearly closed loop, may have a wobbly appearance, etc.

The design of the cooking appliance 1 as shown is a design based on having circular peripheries. That does not alter the fact that another design is possible as well. For example, the pot 2 and the base 3 may have an oval design, wherein it is possible to apply a heating element 52 which also has an oval shape.

A coupling between the stirring means 40 and the spindle 32 for driving the stirring means can be established in any suitable way. Furthermore, it is not necessary for the drive spindle 32 to extend all the way up the tube member 27 of the pot 2 in case the shaft member 41 of the stirring means 40 comprises an inner shaft extending in a downward direction from a top side, wherein an end of the inner shaft may couple to the drive spindle 32 at a lower position in the cooking appliance 1 than is the case in the shown example.

For sake of clarity, it is noted that terms like "radial" and "tangential" are to be understood by assuming a cylindrical coordinate system in which the longitudinal axis is constituted by the relevant longitudinal axis.

In principle, stirring of food items in the pot can take place on the basis of a relative movement of the pot and the stirring means. However, for practical reasons, the situation as described in the foregoing, i.e. the situation in which the pot is kept at a fixed position on the base and in which only the stirring means are moved is preferred.

The invention claimed is:

1. An appliance for preparing food, comprising:
   a pot for containing food items, and
   a base for supporting the pot,
   wherein the pot is adapted to be removably arranged on the base,
   wherein the base is equipped with heating means for supplying heat to the pot, which heating means comprise:
   a heating plate having a circular periphery with a radius substantially equal to a radius of the base and pot,
   at least one heating element arranged at a bottom side of the heating plate comprising an inner circular portion and an outer circular portion, which are positioned according to a concentric arrangement,
   wherein the heating means are adapted to only partially contact a bottom of the pot when the pot is in place on the base, through at least one contact area which is at a position which corresponds to a position of the heating element, and
   stirring means which are adapted to be movably arranged in the pot for stirring food items, said stirring means designed for directing the food items to a directly heated area of the bottom of the pot which corresponds to the contact area of the heating means during their movement, and
   wherein the stirring means comprise an assembly of a blade and a shaft member, which is adapted to perform a rotary movement about a longitudinal axis of the shaft member during operation,
   wherein the blade is positioned at an end of the shaft member and extends in a generally radial direction with respect to the longitudinal axis of the shaft member,
   wherein the longitudinal axis of the shaft member coincides with a longitudinal axis of the pot when the stirring means are in place in the pot,
   wherein the blade is designed for having a varying passing resistance to food items along its width,
   wherein the passing resistance is lowest at a radial position which corresponds to a radial position of the directly heated area of the bottom of the pot with respect to the longitudinal axis of the pot, and
   wherein the blade of the stirring means has a tilted orientation about an axis extending in a longitudinal direction of the blade, wherein an extent to which the blade is tilted with respect to a perpendicular orientation to the bottom of the pot varies along its width, and wherein a most tilted portion of the blade is present at a radial position which corresponds to a radial position of the directly heated area of the bottom of the pot with respect to the longitudinal axis of the pot, and wherein the blade is oriented to be backwardly inclined, in a direction of rotation and with respect to a perpendicular orientation to the bottom of the pot.

2. The appliance according to claim 1, wherein a height of the blade of the stirring means varies along its width, and wherein a lowest portion of the blade is present at a radial position which corresponds to a radial position of the directly heated area of the bottom of the pot with respect to the longitudinal axis of the pot.

3. The appliance according to claim 1, wherein at least a portion of the heating element is shaped like a circular ring, and wherein the contact area of the heating means extends along at least a major part of the ring-shaped portion of the heating element.

4. The appliance according to claim 1, wherein at least a portion of the heating element is shaped like a circular ring, wherein the contact area of the heating means extends along at least a major part of the ring-shaped portion of the heating element, wherein a radial position of the ring-shaped portion of the heating element and the contact area of the heating means is in a range of 0.6 to 0.85 of a radius of the bottom of the pot, and wherein the portion of the blade of the stirring means having the lowest passing resistance is present at a corresponding radial position.

5. The appliance according to claim 1, wherein the heating element comprises two portions which are shaped like a circular ring, wherein the ring-shaped portions are positioned according to a concentric arrangement, and wherein the at least one contact area of the heating means for contact to the bottom of the pot is only at a position which corresponds to a position of a ring-shaped portion which is at an outside of the concentric arrangement.

6. The appliance according to claim 1, wherein the heating means comprise a heating plate, and wherein contact between the heating means and the bottom of the pot is along at least one area of the heating plate.

7. The appliance according to claim 1, wherein the blade of the stirring means has a fin-like projection for making food items turn during movement of the stirring means, which fin-like projection extends from the blade, in a generally tangential direction with respect to the shaft member of the stirring means.

8. The appliance according to claim 1, wherein the stirring means are adapted to perform a rotary movement during operation, and wherein the base is equipped with means for driving the stirring means at a speed which is well below 20 revolutions per minute.

9. The appliance according to claim 1, wherein a distance between the bottom of the pot and an edge of the blade of the stirring means which is closest to the bottom of the pot when the stirring means are in place in the pot is at most 0.5 mm.

10. The appliance according to claim 1, wherein a distance between a standing wall of the pot and a free end of the blade of the stirring means which is closest to the standing wall of the pot when the stirring means are in place in the pot is in a range of 5 to 8 mm, wherein a height of the free end of the blade is in a range of 10 to 15 mm, and wherein a difference between the height of the lowest portion of the blade and the height of the free end of the blade is at most 5 mm.

11. The appliance according to claim 1, wherein the base comprises a drive spindle for driving the stirring means, which drive spindle projects from the base and is rotatably arranged with respect to the base, wherein the pot comprises a tube member which is open at both ends and which extends in the pot starting from a location at the bottom of the pot where a hole is provided in the bottom, wherein the hole is adapted to allow the drive spindle to pass when the pot is put in place on the base, wherein the tube member is adapted to accommodate a major part of the drive spindle, and wherein the shaft member of the stirring means is adapted to cover both the tube member and an end of the drive spindle projecting beyond an end of the tube member.

* * * * *